United States Patent [19]

Burnett

[11] Patent Number: 5,615,083
[45] Date of Patent: Mar. 25, 1997

[54] DETACHABLE JOYSTICK FOR A PORTABLE COMPUTER

[75] Inventor: Robert J. Burnett, Dakota Dunes, S. Dak.

[73] Assignee: Gateway 2000, Inc., North Sioux City, S. Dak.

[21] Appl. No.: 570,100

[22] Filed: Dec. 11, 1995

[51] Int. Cl.$^6$ .................................................... G06F 1/16
[52] U.S. Cl. .......................... 361/686; 361/680; 361/683; 364/708.1; 364/709.08; 345/161
[58] Field of Search ..................... 361/680, 681, 361/683, 686; 364/708.1, 709.01, 709.08, 709.09; 345/161; G06F 1/16

[56] References Cited

U.S. PATENT DOCUMENTS

| | | | |
|---|---|---|---|
| 4,575,591 | 3/1986 | Lugaresi | 200/6 A |
| 4,644,339 | 2/1987 | Ruder | 340/731 |
| 4,949,080 | 8/1990 | Mikan | 340/711 |
| 4,982,618 | 1/1991 | Culver | 74/471 |
| 5,049,863 | 9/1991 | Oka | 340/710 |
| 5,126,955 | 6/1992 | Tomoda | 364/708.1 |
| 5,187,468 | 2/1993 | Garthwaite et al. | 340/709 |
| 5,341,154 | 8/1994 | Bird | 345/167 |
| 5,358,343 | 10/1994 | Klauber | 400/485 |
| 5,424,912 | 8/1993 | Mikan | 361/680 |
| 5,428,355 | 6/1995 | Jondrow et al. | 341/20 |
| 5,490,039 | 2/1996 | Helms | 361/683 |

FOREIGN PATENT DOCUMENTS

| | | | |
|---|---|---|---|
| 000506335 | 9/1992 | European Pat. Off. | 361/680 |
| 405333959 | 12/1993 | Japan | 361/680 |

*Primary Examiner*—Leo P. Picard
*Assistant Examiner*—Lynn D. Feild
*Attorney, Agent, or Firm*—Schwegman, Lundberg, Woessner & Kluth, P.A.

[57] ABSTRACT

A computer system combines a portable computer and a detachable joystick. A mounting bracket on the joystick locks into a receptacle on the computer providing a stable and secure base for operating the joystick. Electrical contacts integrated into the mounting bracket mate with corresponding electrical contacts in the receptacle to transmit signals from the joystick to the portable computer.

10 Claims, 2 Drawing Sheets

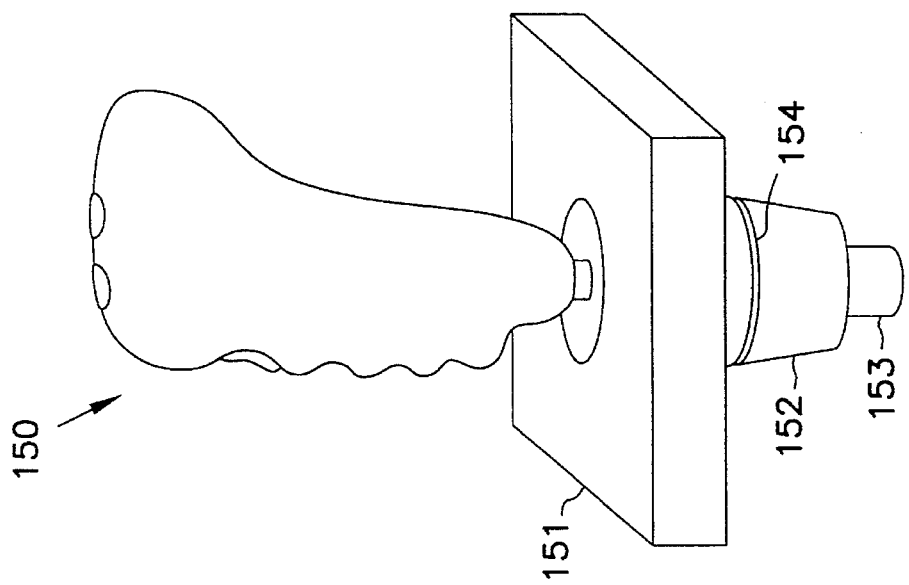
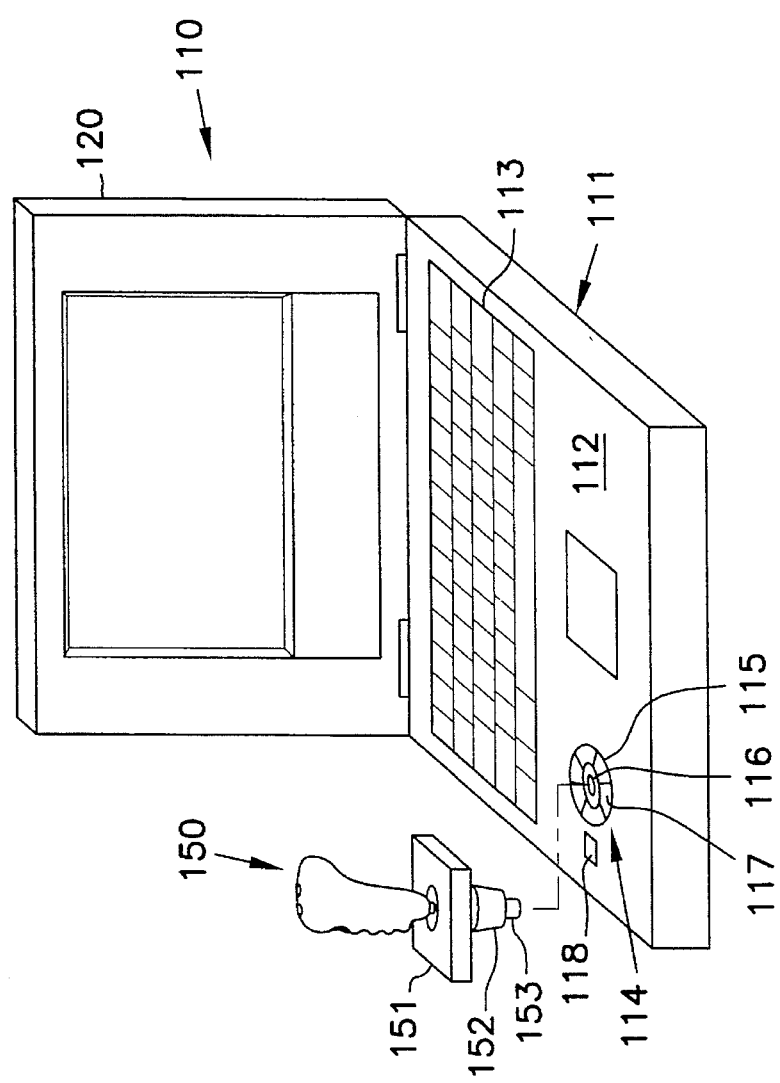
FIG. 2
FIG. 1

DETACHABLE JOYSTICK FOR A PORTABLE COMPUTER

FIELD OF THE INVENTION

The present invention is related to portable computers and in particular to attaching a joystick to a portable computer.

BACKGROUND OF THE INVENTION

Portable computers ("lap-tops") have become as powerful as desktop computers and many lap-top owners are using a lap-top as their primary computer system. These users need the ability to run a wide spectrum of software and to connect various kinds of peripherals to their lap-tops.

One of the peripherals users frequently employ is a pointing device to control the cursor on the computer screen and to execute commands. Users want a minimum amount of elapsed time between the time they move the pointing device and the time the cursor changes its position, and between the time they press a button on the pointing device and the appropriate command is executed ("response time"). For general application software, a mouse or trackball connected to the computer through a serial port provides sufficient responsiveness. However, users of game software and other near real-time applications demand almost instantaneous response time from the pointer device which cannot be provided by serial mice or trackballs because of the limitations of the serial interface.

When a serial pointing device has information to send, it generates an "attention" signal, called an "interrupt", to the computer. The device then waits until the computer requests the data. Once the computer notified the device it is ready to receive the data, the device sends electrical signals to the computer that are translated by specialized software into cursor position coordinates and executory commands. However, the device can only send the information one bit at a time, i.e. serially. Because the serial interface must wait for its interrupt to be acknowledged and must send its data serially, serial pointing devices do not transmit information to the computer quickly enough for near real-time applications such as computer games.

To provide the almost instantaneous response time required for game-type software, personal computer manufacturers developed a special interface, usually called a game port. This interface sends the cursor position coordinate and executory command signals in parallel rather than serially. Also, unlike the operation of the serial interface, the computer does not wait for the game port to notify the computer that the port has data but instead the computer queries the port at regular intervals. The frequency of these queries, otherwise known as the polling rate, determines the response time of the device. With the polling rate set at a high value, the game port can provide near real-time response.

Unlike general applications, an integral part of game software is the requirement for rapid cursor movement throughout the 2-dimensional plane of the computer screen combined with the ability to simultaneously execute commands. Neither mice nor trackballs are designed to provide this functionality. Instead most game players use a device called a joystick for complete enjoyment and control of the game action. Joysticks are patterned after airplane control sticks and allow for quick 360° changes in cursor direction by corresponding movements of the control stick. In addition, most joysticks have at least one button built into the stick to "fire" commands to the computer while the control stick is being manipulated. Although some joysticks are serial devices, the majority are designed to interface to the game port to provide a desired quick response.

Therefore, lap-top users who want the most enjoyment from their game software need a joystick connected to a game port. In response, some manufacturers have provided game ports on their lap-tops but the implementation of the joystick presents several problems. A standard joystick is a cumbersome device because of the control stick protruding from its base. The base is usually weighted and given non-skid pads to prevent it from sliding around due to the torque generated by the user when manipulating the control stick. In addition, a standard joystick has a cable that connects to the game port to transmit the cursor position coordinate and executory command signals from the joystick to the computer. This cable must make good electrical contact with the game port to avoid data loss. However, the game port connector on many joystick cables is simply a plug that fits over or into the game port. On other cables, the connector has screws to secure it to the game port. Neither type guarantees a good electrical contact as the connector can be dislodged easily if the cable is jerked or pulled due to the looseness of the fit between the plug and the game port, or because users seldom bother to screw the second type of connector in place. The long length of the cable combined with its limited flexibility due to the wiring it contains only adds to the bulk of the joystick.

The advantage of a lap-top computer is that it can be operated virtually anywhere, but game players often find themselves in unwieldy positions when using a joystick with a lap-top. On an airplane, for instance, users usually resort to putting the lap-top on the fold-down tray, holding the joystick in one hand while manipulating it with the other, and coiling the excess cable out of harms way in their laps. These drawbacks make using a standard joystick with a lap-top in tight quarters an awkward challenge.

Permanently mounting a joystick to the lap-top would alleviate most of the drawbacks associated with using a standard joystick. The lap-top would provide the mass necessary to keep the joystick in place. However, the shape of a joystick makes implementation of the concept impractical. The control stick protruding from a lap-top case could be easily damaged and would prevent the lap-top from fitting well in a brief case. In addition, space on a lap-top case is always at a premium and the area taken up by the joystick is lost to any other use.

Various ideas for temporarily attaching a standard joystick to a computer case have been tried, usually using Velco™ or sticky tapes. However, the user still must contend with the long joystick cable and the vulnerable connection between the cable plug and the game port. Furthermore, the nature of such temporary attachments is to be easily detached and the user must be careful not to apply so much force to the control stick that the temporary attachment is dislodged. Finally, a standard joystick still has a weighted base and increases the load the lap-top user carries.

SUMMARY OF THE INVENTION

A portable computer ("lap-top") has a special receptacle built into the palm rest portion of its case. A detachable joystick with a mounting bracket that fits into the receptacle and a locking arrangement secures the mounting bracket in the receptacle. Electrical connections are integrated into the bracket and receptacle for relaying electrical signals generated by the joystick to the portable computer.

The joystick is easily attached to the lap-top when the user wants to run game software or other applications that require or recommend using a joystick. When attached, the joystick is locked into place and the mass of the lap-top provides a stable platform for operating the control stick. The user does not have to find a free area to place the joystick or be concerned about forceful movements dislodging the joystick from its location. Also, because the lap-top acts as a stable base for the joystick, the base on the joystick itself does not have to be weighted and does not contribute significantly to the load the lap-top user must carry. The joystick quickly unlocks and detaches from the lap-top when not in use, thereby eliminating the awkwardness and potential for damage to the control stick from having it protruding from the computer case during storage and transport.

Furthermore, the present invention incorporates the electrical connections for the game port and the joystick into the receptacle and mounting bracket so no external cable is necessary. These internal connections provide a good electrical contact that cannot be disconnected regardless of the tightness of the working space.

In one embodiment of the computer system, a standard lap-top case has a palm rest section with a hole molded in part of the palm rest. A retractable collar is attached to the rim of the hole that locks around a corresponding mounting bracket attached to the joystick when the joystick is inserted into the hole. A quick-release button is mounted on the case and coupled to the collar to unlock the collar from the mounting bracket. An industry standard game port is positioned within the hole to mate with a corresponding standard game port plug positioned on the mounting bracket. In this embodiment, the mounting bracket is molded as a cylinder which fits tightly in the hole in the palm rest and has a circumferential groove formed into the bracket.

This invention addresses and solves the problems of using a joystick with a lap-top computer. It does so by locking a removable joystick into a special receptacle on the palm rest of the lap-top case so that the lap-top itself functions as a stable platform for the control stick and the joystick base does not have to be weighted. By providing integrated electrical connections in the joystick's mounting bracket and in the receptacle a stable electrical connection is achieved, reducing the chance of faulty communication between the joystick and the computer. Unwieldy joystick cables are eliminated. Furthermore provision of a joystick for a lap-top computer is accomplished without adding an awkward, space-consuming and easily damaged permanent appendage to the lap-top case

BRIEF DESCRIPTION OF THE DRAWINGS

FIG. 1 is a perspective view of the present invention illustrating a joystick detached from a portable computer.

FIG. 2 is an enlarged, perspective view of the joystick shown in FIG. 1.

DESCRIPTION OF THE PREFERRED EMBODIMENTS

Figure 3:
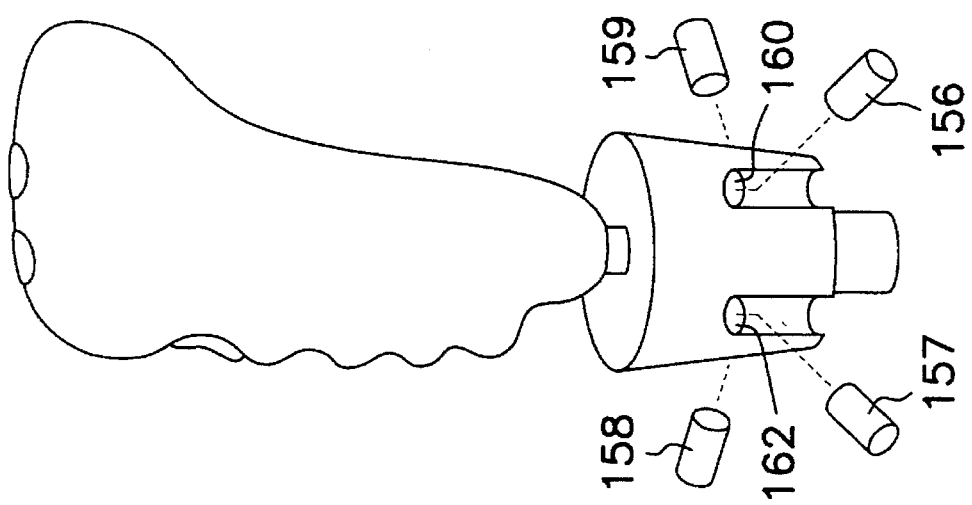
FIG. 3 is an enlarged, perspective view of an alternative joystick in accordance with the present invention.

In the following detailed description of the preferred embodiment, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims. Numbering of elements may be consistent between figures where the same elements are being depicted.

FIG. 1 shows a front perspective of a portable computer 110 generally small enough to carry in a briefcase, such as a Gateway 2000 Solo lap-top, and a detachable joystick 150.

The computer 110 comprises a computer case 111 having a section reserved as palm rest 112 located in front of a keyboard 113. In addition, a case has a monitor 120 coupled to it, and memory and processor circuitry within the case. A hole 114 with a rim 115 is formed through injection molding in part of the palm rest 112. The material forming the hole 114 is the same type of plastic as that typically used for lap-top computer cases. The hole 114 is integrated with the top of the lap-top and fully supported by it to form a stable receptacle for the joystick 150. A slightly recessed, multi-segmented spring-biased retractable collar 117 (shown partially open) is coupled to the rim 115 of the hole 114 and formed to automatically lock around a mounting bracket 152 integrated with the joystick 150. A quick-release button 118 is mounted on the case 111 near the hole 114 and is coupled to the springs biasing the collar 117 via a standard lever mechanism to retract the collar 117 and release the joystick 150 when pressed.

A standard game port 116 is positioned within the hole 114 and coupled to a computer system board with a flexible connector (not shown) to ensure repeated attachments and detachments of the joystick 150 do not stress the system board. When the joystick 150 is not present, the retractable collar 117 closes to completely cover the hole 114 and protect the game port 116 from contaminants. In a further embodiment, the game port 116 is supported from the top of the lap-top case 111, providing a physically integrated structure for receiving the joystick 150.

Joystick 150 comprises a standard joystick 151, such as a Logitech Wingman or a Gravis Pro Joystick, having the mounting bracket 152 coupled to its base. In an alternate embodiment, the joystick 151 is specially manufactured to be smaller than a standard joystick to better suit the amount of space available on the laptop's palm rest and to further reduce the joystick's bulk and weight. The smaller joystick 151 measures approximately three inches high from top to base and has a correspondingly reduced base and "fire" buttons. Other sizes of joysticks may also be used depending on the desired characteristics and ergonomic factors.

The bracket 152 is formed to fit snugly in the hole 114 to ensure stability of the joystick 150 when used in a normal game playing manner. A standard game port plug 153 is integrated in the bottom of the mounting bracket 152 and designed to provide electrical contact with the game port 116 when the joystick is secured in the hole 114 by the retractable collar 117. Both the game port 116 and the game port plug 153 are suitably keyed to ensure proper electrical connections are made. An alternate embodiment replaces game port 116 and game port plug 153 with connectors compatible with the emerging Universal Serial Bus specifications. Unlike the relatively slow speed of the existing serial bus interface, the Universal Serial Bus is designed to support data transfers up to 12 Mbps, fast enough for the near real-time response required for game software. The use of other electrical interfaces with suitable response times, such as the Apple Desktop Bus, and the corresponding connectors for those interfaces will be apparent to those skilled in the art.

Furthermore as shown in FIG. 2, the mounting bracket 152 is formed as a slightly tapered cylinder to provide a wedge to open the retractable collar 117 and to allow the collar 117 to ride up on the bracket 152 until the collar 117 snaps into a groove 154 formed in the bracket 152. In addition, the tapered cylinder is keyed to match the receptacle opening in the lap top case so that only one orientation of the joystick with respect to the lap-top is possible. This ensures that correct electrical connection will be made. The groove 154 and collar 117 are square in one embodiment so that forces applied to the joystick will not force the collar 117 out of the groove. In another embodiment, the groove 154 and collar 117 are slightly rounded so that excessive force, which might otherwise damage the joystick or laptop case, causes release of the joystick. The interlocking of the groove 154 and the collar 117 prevents the joystick from moving in the hole 114 vertically, and the tension created by the bracket 152 pressing the segments of the collar 117 open against the biasing springs locks the joystick 150 into place laterally.

In a further embodiment, the collar 117 comprises a plurality of overlapping pie-shaped segments having blunt tips formed to fit into the groove in the mounting bracket. A plurality of springs is coupled to the plurality of segments so that the plurality of segments form a solid circle when the springs are unbiased. When the joystick is locked into place laterally within the receptacle by the plurality of segments, the springs are biased by the mounting bracket 152 pressing against the plurality of segments. In this embodiment, four segments provide the retentive force required to provide a stable base for the joystick 150. In yet a further embodiment, the receptacle and bracket are square or rectangular in shape. Other shapes, such as triangles and various star shapes will be apparent to those skilled in the art. Such shapes will also provide suitable keying to ensure proper orientation of the joystick.

Other mechanisms for attaching and detaching the joystick 150 from the lap-top 110, and alternate locations for those mechanisms, will be apparent to those skilled in the art, as will the use of alternate materials and manufacturing methods for making the computer case 111 and the joystick mounting bracket 152. In a further embodiment, a plurality of spring biased small cylinders 156 and 157 shown detached from and in place of the collar 117 in the receptacle, with corresponding cylindrical openings 160 and 162 being provided on the mounting bracket as shown in FIG. 3. Further cylinders, or retractable protrusions 158 and 159 mate with cylindrical openings on the non-visible side of the joystick mounting bracket. Vertical grooves 164 and 166 are formed in the mounting bracket to guide the cylinders 156 and 157 into the opening during insertion. To ensure that correct electrical connection is made, the rods and vertical grooves are positioned so that the joystick may be inserted in only one orientation. To release the joystick, a button on the base of the joystick is coupled to rods which simply push the cylinders out of the cylindrical openings, whereupon the joystick is lifted out of the lap-top. The same type of release mechanism is used in a further embodiment having the segments shown in FIG. 1. In yet a further embodiment, the small cylinders are reversed, such that the mounting bracket has the openings, and the receptacle has the rods. There is no requirement that the protrusions or rods be cylidrical. Other shapes, such as half cylinder or square will be apparent to those skilled in the art.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:

a joystick;

a portable computer having a case with a palm rest formed thereon;

a mounting bracket coupled to the joystick for detachably affixing the joystick to the portable computer;

a receptacle formed in the palm rest of the portable computer to fit the mounting bracket;

a locking mechanism for providing a secure and stable base for the joystick when the mounting bracket is coupled to the receptacle; and an electrical connection between the portable computer and the joystick for relaying electrical signals generated by the joystick to the portable computer.

2. The computer system as in claim 1, wherein:

the electrical connection comprises:

at least one electrical contact coupled to the mounting bracket for transmitting the electrical signals generated by the joystick; and at least one electrical contact positioned within the receptacle to mate with the corresponding electrical contact on the mounting bracket for receiving the electrical signals generated by the joystick.

3. The computer system as in claim 2, wherein the locking mechanism comprises:

a retractable collar positioned within the receptacle, formed to fit around the mounting bracket of the joystick and to automatically lock the joystick in place when the mounting bracket is coupled to the receptacle.

4. The computer system as in claim 3, wherein:

the receptacle is a cylindrical hole; and the mounting bracket comprises:

a slightly tapered cylinder having a narrow end opposite the joystick which fits within the open the retractable collar and provides a surface to allow the collar to ride up on the bracket during insertion into the hole; and a circumferential groove formed in the cylinder so that the retractable collar snaps into the groove and prevents the mounting bracket from moving in the receptacle vertically.

5. The computer system as in claim 4, wherein the retractable collar comprises:

a plurality of overlapping pie-shaped segments having blunt tips formed to fit into the groove in the mounting bracket;

a plurality of springs coupled to the plurality of segments so that the plurality of segments form a solid circle when the plurality of springs are unbiased and so that the joystick is locked into place laterally within the receptacle by the plurality of segments when the plurality of springs are biased by the mounting bracket pressing against the plurality of segments.

6. The computer system as in claim 2, wherein the locking mechanism comprises:

a plurality of retractable protruding members positioned within the receptacle; and a corresponding plurality of openings in the mounting bracket for mating with the protruding members.

7. The computer system as in claim 6, wherein:

the receptacle is a cylindrical hole; and the mounting bracket comprises:

a slightly tapered cylinder having a narrow end opposite the joystick which fits within the receptacle and providing grooves to allow the protruding members to ride up the grooves into the openings in the bracket during insertion into the receptacle.

8. A lap-top computer system, comprising:

a case having a keyboard, monitor, and memory and processor circuitry within the case;

a receptacle formed in the case adjacent the keyboard, said receptacle having a joystick electrical connector integrated therein;

a joystick having a mounting bracket and electrical connector coupled thereto, wherein the mounting bracket is formed to fit snugly within the receptacle; and a locking mechanism integrated into the receptacle to lock the mounting bracket of the joystick into a retentive position within the receptacle such that the electrical connector of the joystick and the electrical connector of the receptacle are electrically coupled.

9. The computer system of claim 8 wherein the mounting bracket and receptacle are both generally cylindrical in shape.

10. The computer system of claim 8 wherein the mounting bracket and receptacle are keyed such that the joystick fits in only one orientation in the receptacle.

* * * * *